US 008265607B2

(12) United States Patent
Wormald et al.

(10) Patent No.: US 8,265,607 B2
(45) Date of Patent: Sep. 11, 2012

(54) SYSTEM AND METHOD FOR PROVIDING AN INTERACTIVE CONTENT PORTAL ON A MOBILE DEVICE

(75) Inventors: Christopher R. Wormald, Waterloo (CA); Martyn Henri Mallick, Waterloo (CA); James Laurence Balsillie, Waterloo (CA)

(73) Assignee: Research In Motion Limited, Waterloo (CA)

( * ) Notice: Subject to any disclaimer, the term of this patent is extended or adjusted under 35 U.S.C. 154(b) by 527 days.

(21) Appl. No.: 12/507,318

(22) Filed: Jul. 22, 2009

(65) Prior Publication Data
US 2010/0035589 A1 Feb. 11, 2010

Related U.S. Application Data

(60) Provisional application No. 61/086,888, filed on Aug. 7, 2008.

(51) Int. Cl.
*H04M 3/42* (2006.01)
(52) U.S. Cl. .................... 455/414.1; 455/466; 705/14.4; 705/14.64; 715/784
(58) Field of Classification Search .............. 705/14.99, 705/14.64, 14.52, 14.73, 14.69, 14.58, 14.4, 705/14.41, 26.8; 348/E5.105, E7.063, E5.112, 348/E7.071; 707/E17.109, E17.032, E17.11, 707/E17.111; 715/234, 765; 455/414
See application file for complete search history.

(56) References Cited

U.S. PATENT DOCUMENTS

| | | | | |
|---|---|---|---|---|
| 2005/0039135 | A1* | 2/2005 | Othmer et al. | 715/774 |
| 2007/0060114 | A1* | 3/2007 | Ramer et al. | 455/418 |
| 2007/0100981 | A1* | 5/2007 | Adamczyk et al. | 709/223 |
| 2007/0249330 | A1* | 10/2007 | Cortegiano et al. | 455/414.2 |
| 2007/0294725 | A1* | 12/2007 | Cohen et al. | 725/37 |
| 2008/0133336 | A1 | 6/2008 | Altman et al. | |

(Continued)

FOREIGN PATENT DOCUMENTS
WO WO 2007/033358 A2 3/2007
(Continued)

OTHER PUBLICATIONS

Bayaa, Hassan; International Search Report from corresponding PCT Application No. PCT/CA2009/001009; search completed Nov. 10, 2009.

(Continued)

*Primary Examiner* — Jean Gelin
*Assistant Examiner* — Mahendra Patel
(74) *Attorney, Agent, or Firm* — Brett J. Slancy; Blake, Cassels & Graydon LLP

(57) ABSTRACT

A portal application is provided that can be used on a mobile device to display relevant advertising content to the user at convenient times. The portal application can utilize a portal browser that is launched when appropriate, which displays the advertising content in an interactive way and enables the user to follow up with tasks requiring a data connection that is currently unavailable, by keeping track of a user queue. The advertising content may be filtered from a base of advertising content provided by the advertising content providers in advanced and is pre-fetched and stored in an advertising content cache for convenient access when appropriate. The portal application can be used with a location estimator to narrow and categorize the advertising content at least in part based on location, either physical location or preferred location or both based on a hierarchy of relevant data.

21 Claims, 13 Drawing Sheets

U.S. PATENT DOCUMENTS

| | | | |
|---|---|---|---|
| 2008/0214150 A1 | 9/2008 | Ramer et al. | |
| 2009/0012704 A1* | 1/2009 | Franco et al. | 701/200 |
| 2010/0312643 A1* | 12/2010 | Gil | 705/14.55 |
| 2011/0004678 A1* | 1/2011 | Rothrock | 709/223 |

FOREIGN PATENT DOCUMENTS

| | | |
|---|---|---|
| WO | WO 2008/081420 A2 | 7/2008 |

OTHER PUBLICATIONS

"Activating The Idle Screen", http://mobileposse.com/idle_screen, Accessed at least on Nov. 13, 2008.

"Live Screen components", http://www.celltick.com/index.php?option=com_content&view=article&id=50-&Itemid=88, Accessed at least on Nov. 13, 2008.

"Psiloc: Location Aware Applications", http://www.psiloc.com/en/Expertise_and_Skills/Fields_of_Expertise/803.Location_Aware_Applications, Accessed at least on Nov. 13, 2007.

Caracas, Alexandru, Ion, Iulia, Ion, Mihaela, "Web Services and Data Caching for Java Mobile Clients", International University in Germany, 76646 Bruchsal, Germany, Jan. 27, 2007.

Belic, Dusan, "Motorola launches Motocast: Wants to puch content directly to your phone's home screen", http://www.intomobile.com/2007/06/09/motorola-launches-motocast-wants-to-push-content-directly-to-your-phones-home-screen.html, Jun. 9, 2007.

Cheng, Jacqui, "Mobile Ads Move Out of the Browser", http://arstechnica.com/gadgets/news/2007/08/mobile-ads-move-out-of-the-browsers.ars, updated Aug. 8, 2007.

Amini, Reza, "Keyboard-Based Advertisements on Mobile Phones in the USA and the UK", http://mobile14.com?p=2355, Oct. 4, 2006.

"Googie Ads on Mobile Phones", http://www.tomw.net.au/technology/it/google_mobile_ads.php?slides, Oct. 15, 2007.

* cited by examiner

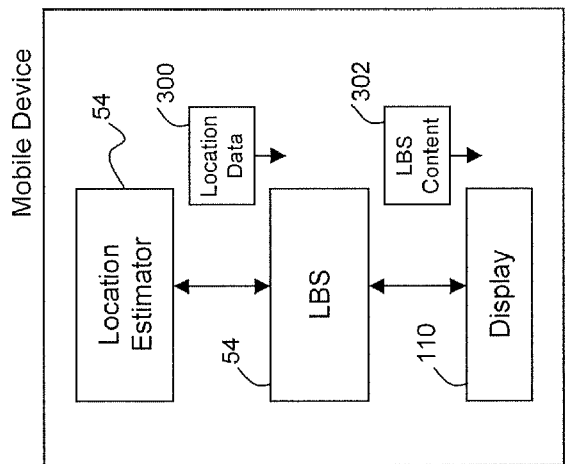
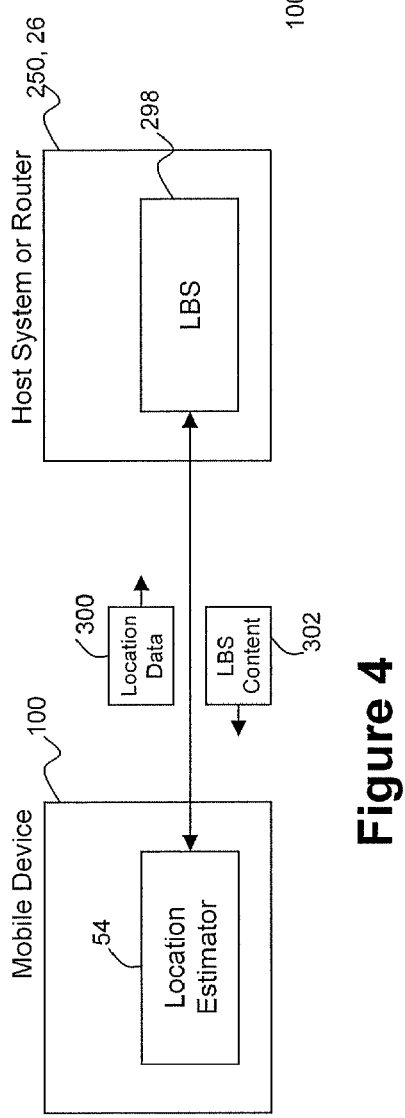
Figure 4
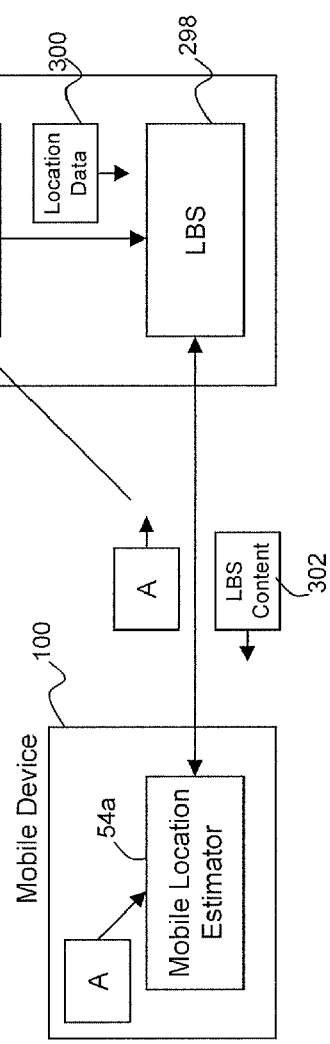
Figure 6
Figure 5

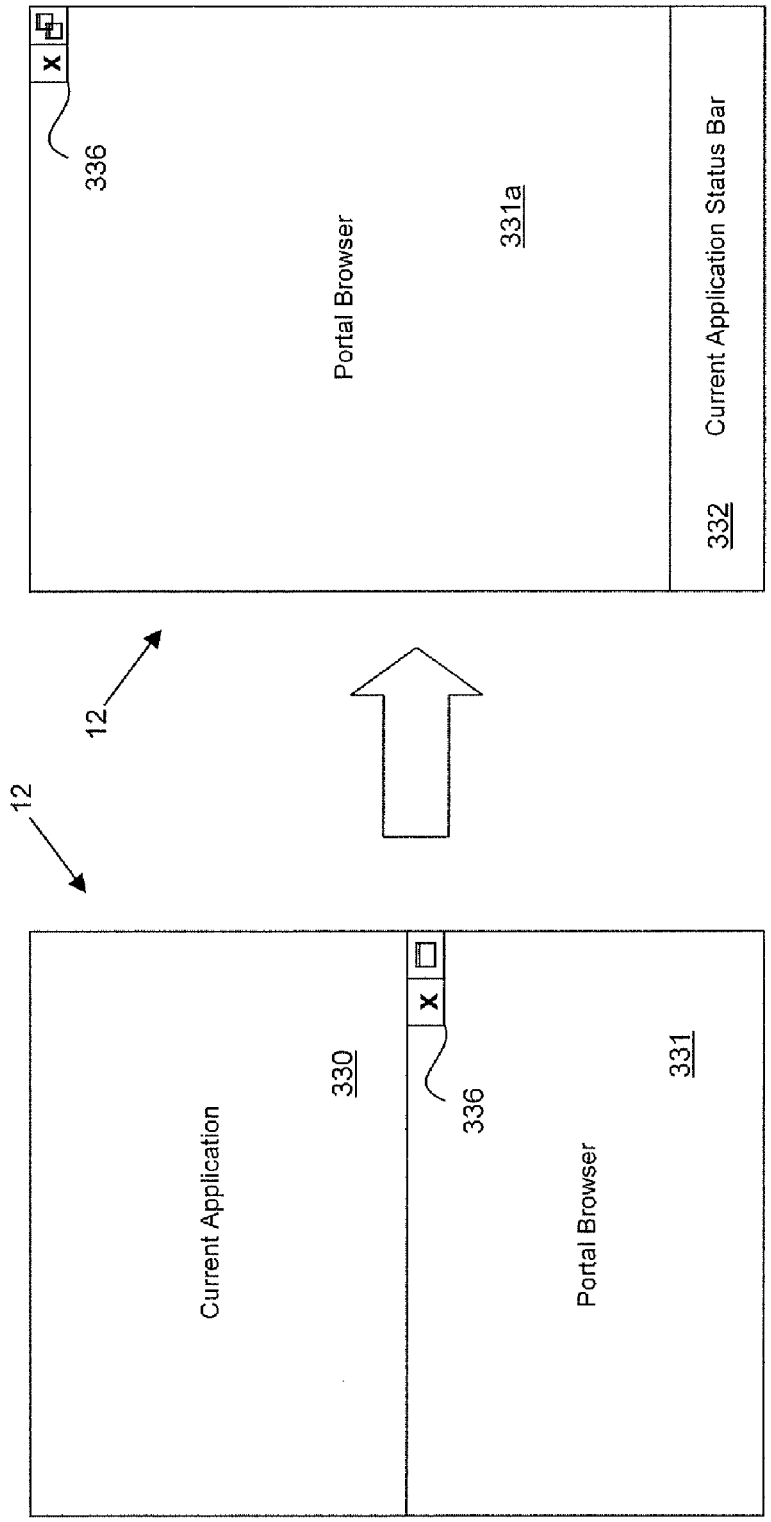

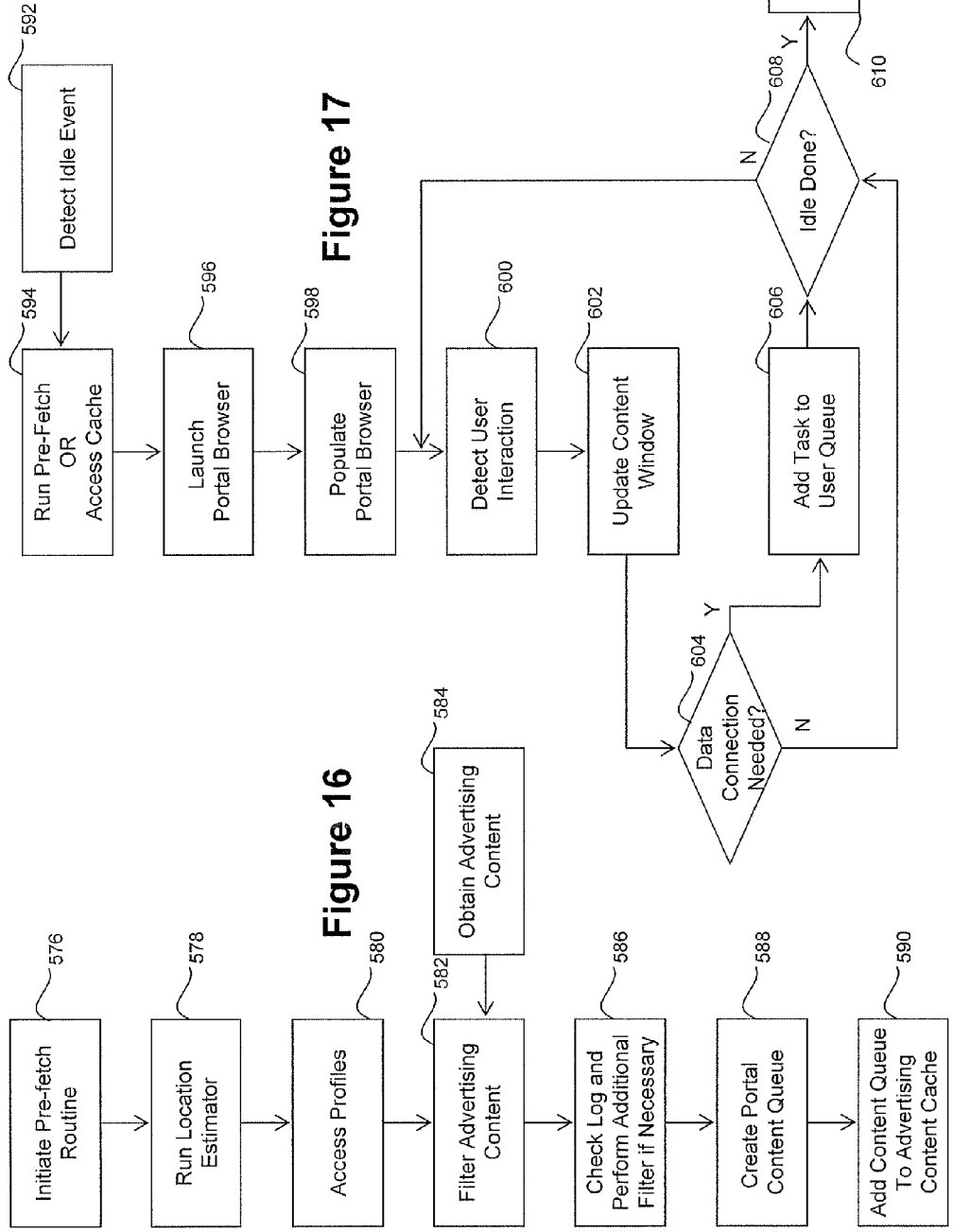

SYSTEM AND METHOD FOR PROVIDING AN INTERACTIVE CONTENT PORTAL ON A MOBILE DEVICE

This application claims priority from U.S. provisional application No. 61/086,888 filed on Aug. 7, 2008, the contents of which are incorporated herein by reference.

TECHNICAL FIELD

The following relates generally to mobile telecommunications, and more particularly, to systems and methods for providing an interactive content portal on a mobile device.

DESCRIPTION OF THE RELATED ART

Advertising, both direct advertising and that which is associated with a provided service (e.g. brought to you by Company X) may be used as a way to offset the cost of providing such a service, e.g. wherein the advertiser pays for all or part of the service in exchange for a venue to present advertising content to one or more users. Advertising may only be effective if the user is interested in the content and can become a nuisance if the user is overwhelmed with too much content, or content that may be deemed inappropriate or irrelevant.

Accordingly, the way in which advertising content is gathered and distributed is generally done with the end user in mind. When advertising through television, radio and the Internet, advertising content is traditionally directed to what the likely audience would be for the delivered content. This can be a useful way for advertisers to be confident that they are advertising in the most appropriate venue, at least in a general sense, but may only work when broadcasting according to a schedule or associating the advertising content with a particular medium such as a website that has a specific purpose or target audience.

On a mobile device, although the user may have access to such broadcasted content and may be able to access particular media, various other uses of the mobile device may command the user's attention at various times during a given day. As such, advertising on a mobile device can be more challenging than simply associating generic advertising content with a given medium.

BRIEF DESCRIPTION OF THE DRAWINGS

Embodiments will now be described by way of example only with reference to the appended drawings wherein:

FIG. 4 is a system diagram of one configuration for a location estimator that provides location data to a location based service (LBS) and receives LBS content from the LBS in accordance with one embodiment.

FIG. 5 is a system diagram of another configuration for a location estimator that provides location data to an LBS and receives LBS content from the LBS in accordance with one embodiment.

FIG. 6 is a system diagram of yet another configuration for a location estimator that provides location data to an LBS and receives LBS content from the LBS in accordance with one embodiment.

FIG. 14(a) is a screen shot showing a portal browser launched by the portal application during use of a current application.

FIG. 14(b) is a screen shot showing the portal browser during maximum screen use.

FIG. 16 is a flow diagram illustrating an exemplary method for pre-fetching advertising content in the configuration shown in FIG. 13.

FIG. 17 is a flow diagram illustrating an exemplary method for using the portal application.

DETAILED DESCRIPTION

Figure 1:
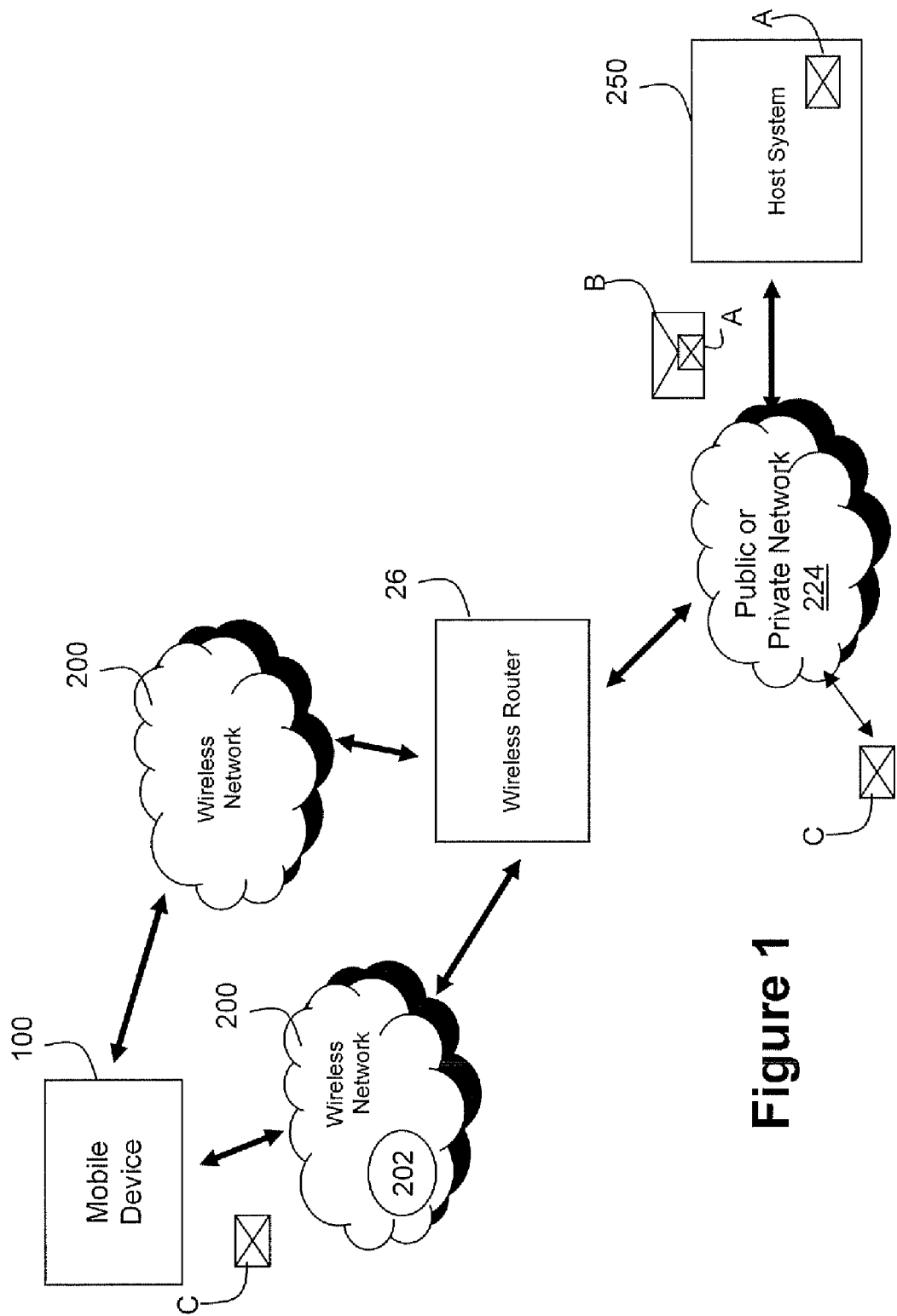
FIG. 1 is a block diagram illustrating an exemplary environment in which data items are pushed from a host system to a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It has been recognized that various instances where one or more channels on a mobile device are idle or inactive can provide an appropriate venue and an appropriate time for directing advertising content to the mobile device user. As will be discussed herein, a portal application is provided that can be used on a mobile device, either at predetermined or event driven times or by sensing a user initiation, to display relevant advertising content to the user at convenient times. The portal application thus provides an interactive content portal on the mobile device. In this way, advertising content providers can be more confident that the advertising space they are purchasing is being directed to the appropriate users and the users can be confident that they are unlikely to be overwhelmed with advertising content at inappropriate times with inappropriate content. The portal application can be launched when appropriate to display the advertising content in an interactive way, which may also enable the user to follow up with tasks requiring a currently unavailable data or voice connection, by keeping track of a queue of user-initiated tasks. The advertising content may be filtered from the base of advertising content provided by the advertising content providers in advance and can be pre-fetched and stored in an advertising content cache for convenient access when appropriate. Screen control of the portal application also allows the user to get more out of their browsing experience during the idle event, e.g. for the duration of a phone call which may require minimal user activity other than voice.

It has also been recognized that the location of a mobile device and its user, both physically and according to user preferences, can be more intelligently estimated using a multi-level hierarchy that includes not only available device-tracking mechanisms but also user input. As will also be described, the portal application and any other location based service (LBS) can be used with a location estimator to narrow and categorize the advertising content at least in part based on location, either physical location or preferred location or both. The location estimator can therefore improve the filtering of the advertising content and the portal application illustrates one example of an application making use of an LBS. The different configurations described herein are for illustrative purposes only and it will be appreciated that variations of these configurations can be made while utilizing the principles discussed herein.

Examples of applicable communication devices include without limitation pagers, cellular phones, satellite phones, smart-phones, wireless organizers, personal digital assistants, computers, laptops, handheld wireless communication devices, wirelessly enabled notebook computers, wireless media players, wireless navigation devices, wireless heart or exercise monitors, and the like. Such devices will hereinafter be commonly referred to as "mobile devices" for ease of illustration.

An exemplary mobile device generally comprises a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

The mobile device may be one that is used in a system that is configured for continuously routing all forms of pushed information from a host system to the mobile device. One example of such a system will now be described.

Figure 11:
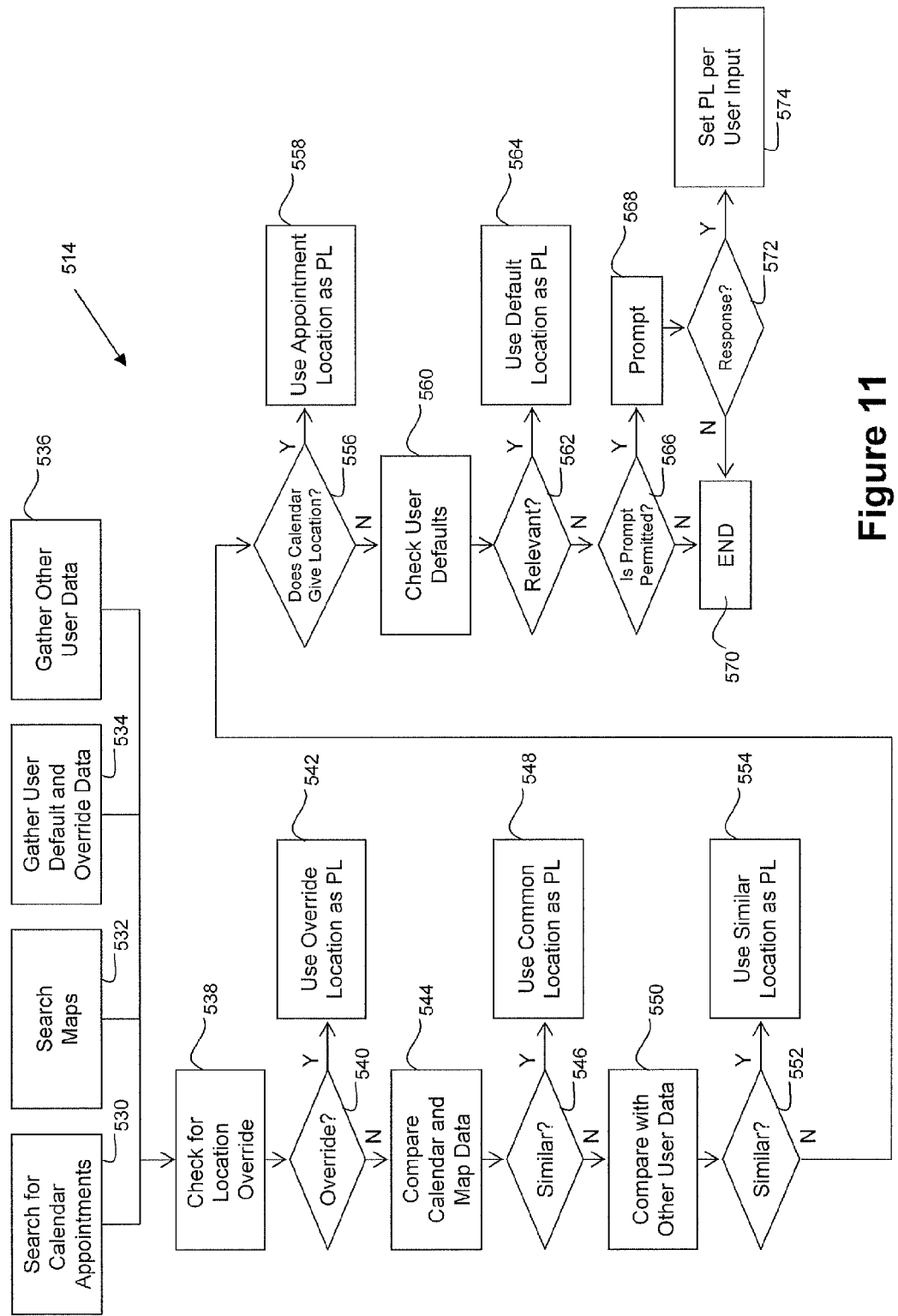
FIG. 11 is a flow diagram illustrating a method for estimating the physical location of a mobile device according to user input data.

Referring now to the drawings, FIG. 1 is a block diagram showing an exemplary system for the redirection of user data items (such as message A or C) from a corporate enterprise computer system (host system) 250 to the user's mobile device 100 via a wireless router 26. The wireless router 26 provides the wireless connectivity functionality as it acts to both abstract most of the wireless network's 200 complexities, and it also implements features to support pushing data to the mobile device 100. Although not shown, a plurality of mobile devices may access data from the host system 250. In this example, message A in FIG. 1 represents an internal message sent from, e.g. a desktop computer 262 within the host system 250 (see FIG. 11), to any number of server computers in the corporate network 260 (e.g. LAN), which may, in general, comprise a database server, a calendar server, an E-mail server or a voice-mail server. More detail concerning the host system 250 will be provided below and is shown in FIG. 11.

Message C in FIG. 1 represents an external message from a sender that is not directly connected to the host system 250, such as the user's mobile device 100, some other user's mobile device (not shown), or any user device connected to the public or private network 224 (e.g. the Internet). Message C could be e-mail, voice-mail, calendar information, database updates, web-page updates or could even represent a command message from the user's mobile device 100 to the host system 250. The host system 250 may comprise, along with the typical communication links, hardware and software associated with a corporate enterprise computer network system, one or more wireless mobility agents, a TCP/IP connection, a collection of datastores, (for example a data store for e-mail could be an off-the-shelf mail server like Microsoft Exchange® Server or Lotus Notes® Server), all within and behind a corporate firewall as will be explained further below.

The mobile device 100 may be adapted for communication within wireless network 200 via wireless links, as required by each wireless network 200 being used. As an illustrative example of the operation for a wireless router 26 shown in FIG. 1, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through the wireless router's 26 firewall 27 protecting the wireless router 26 (see also FIG. 8).

Although the above describes the host system 250 as being used within a corporate enterprise network environment, this is just one embodiment of one type of host service that offers push-based messages for a handheld wireless device that is capable of notifying and presenting the data to the user in real-time at the mobile device when data arrives at the host system.

By offering a wireless router 26, there may be a number of advantages to both the host system 250 and the wireless network 200 in accordance with various embodiments. The host system 250 in general runs a host service that is considered to be any computer program that is running on one or more computer systems. The host service is said to be running on a host system 250, and one host system 250 can support any number of host services. A host service may or may not be aware of the fact that information is being channeled to mobile devices 100. For example an e-mail or message program 138 (see FIG. 4) might be receiving and processing e-mail while an associated program (e.g. an e-mail wireless mobility agent) is also monitoring the mailbox for the user and forwarding or pushing the same e-mail to a wireless device 100. A host service might also be modified to prepare and exchange information with mobile devices 100 via the wireless router 26, like customer relationship management software. In a third example, there might be a common access to a range of host services. For example a mobility agent might offer a Wireless Access Protocol (WAP) connection to several databases.

Figure 2:
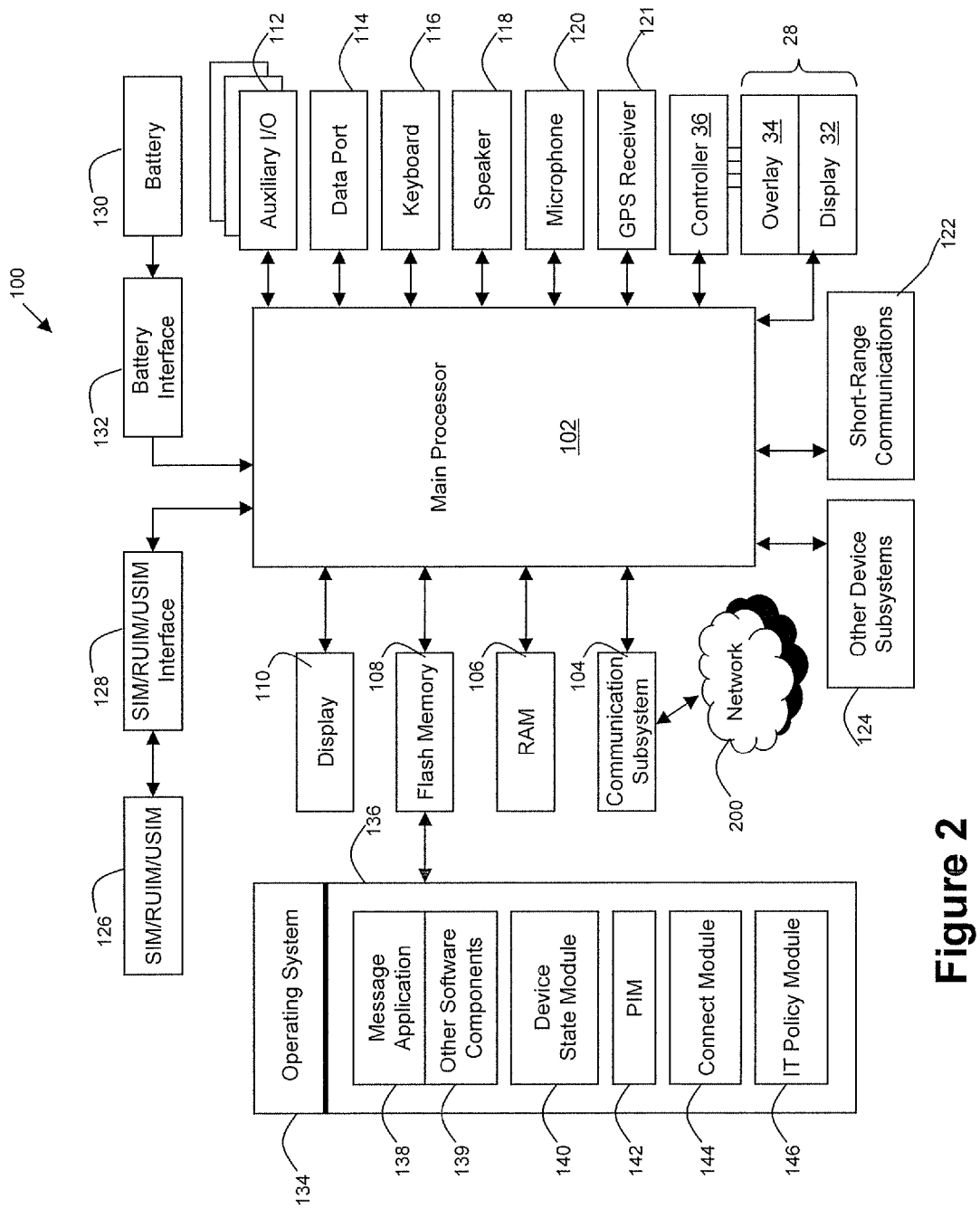
FIG. 2 is a block diagram of an exemplary embodiment of a mobile device.
Figure 3:
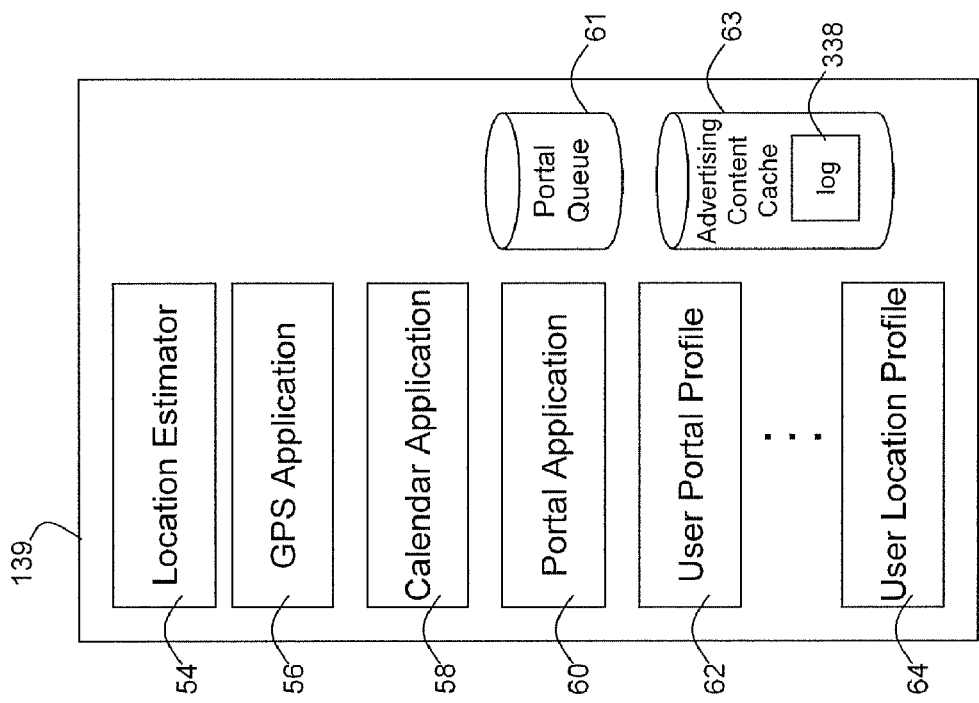
FIG. 3 is a block diagram illustrating exemplary other software applications and components shown in FIG. 2.

As discussed above, a mobile device 100 may be a handheld two-way wireless paging computer as exemplified in FIGS. 2-3, a wirelessly enabled palm-top computer, a mobile telephone with data messaging capabilities, a PDA with mobile phone capabilities, a wirelessly enabled laptop computer, a vending machine with an associated OEM radio modem, a wirelessly-enabled heart-monitoring system or, alternatively, it could be other types of mobile data communication devices capable of sending and receiving messages via a network connection. Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 100 and wireless network 200, offer push services to standard web-based server systems and allow a host service in a host system 250 to reach the mobile device 100 in many countries.

The host system 250 shown herein has many methods when establishing a communication link to the wireless router 26. For one skilled in the art of data communications the host system 250 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/XML, HTTP/Proprietary, FTP, SMTP or some other proprietary data exchange protocol. The type of host systems 250 that might employ the wireless router 26 to perform push could include: field service applications, e-mail services, stock quote services, banking services, stock trading services, field sales applications, advertising messages and many others. This wireless network 200 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 250, or that the host system 250 acquires through the use of intelligent agents, such as data that is received after the host system 250 initiates a search of a database or a website or a bulletin board.

The wireless router 26 provides a range of services to make creating a push-based host service possible. These networks may comprise: CDMA (Code Division Multiple Access) networks, GSM (Groupe Special Mobile or the Global System for Mobile Communications) networks, GPRS (General Packet Radio Service) networks, and third-generation (3G) and fourth-generation (4G) networks including without limitation EDGE (Enhanced Data rates for GSM Evolution), UMTS (Universal Mobile Telecommunications System), HSDPA (High-Speed Downlink Packet Access), LTE (Long Term Evolution), WiMAX (Worldwide Interoperability for Microwave Access), etc. Some older examples of data-centric networks include, but are not limited to: the Mobitex Radio Network ("Mobitex") and the DataTAC Radio Network ("DataTAC").

To be effective in providing push services for host systems 250, the wireless router 26 may implement a set of defined functions. It can be appreciated that one could select many different hardware configurations for the wireless router 26, however, many of the same or similar set of features would likely be present in the different configurations. The wireless router 26 may offer any one or more of the following features for host services: 1) An addressing method so that mobile device 100 traffic can be addressed to a host system 250 without the need for the wireless network 200 to assign an identity to each host system 250; 2) An efficient and authenticated method for the host system 250 to initiate a communication connection to the wireless router 26 for the purposes of opening a communication tunnel to the one or more mobile devices 100 that the host system 250 wishes to communicate with; 3) A reliable method for exchanging data between the host system 250 and the mobile device 100, in a manner consistent with the abilities of the wireless network 200; 4) Providing feedback to the host system 250 when data is delivered, which allows the host system to clean up any wireless delivery queues if necessary, or inform the original sender (user or program) that the data has been delivered to the mobile device 100; 5) Implementation of a wireless network 200 initiated push of services or data to a mobile device 100, from a wireless router 26; and 6) Connecting to a wide range of wireless networks 200 and provide a way of tracking the user's location so that a "follow you anywhere" solution can be provided.

To aid the reader in understanding the structure of the mobile device 100 and how it communicates with the wireless network 200, reference will now be made to FIGS. 2 and 3.

Referring first to FIG. 2, shown therein is a block diagram of an exemplary embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, text messages, instant messages, contacts, calendar events, and voice mails, and may interact with the wireless network 200. A connect module 144 implements the communication protocols that are required for the mobile device 100 to communicate with the wireless infrastructure and any host system 250, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use a the touch-sensitive overlay 34 on the display 32 that are part of the touch screen display 28, in addition to possibly the auxiliary I/O subsystem 122. The auxiliary I/O subsystem 112 may include devices such as: a mouse, track ball, infrared fingerprint detector, or a roller wheel with dynamic button pressing capability. A composed item may be transmitted over the wireless network 200 through the communication subsystem 104.

FIG. 3 shows an example of some of the other software applications and components 139 that may be stored and used on the mobile device 100. Only a few representative examples are shown in FIG. 3 for illustrative purposes and such examples are not to be considered exhaustive. In this example, the mobile device 100 includes, stores and operates a location estimator 54 for gathering and determining location data pertaining to the mobile device 100, the GPS application 56 for obtaining GPS coordinates from the GPS receiver 121 for use with an LBS or on-device mapping functions etc and a calendar application 58 for storing appointments and contacts etc. The other applications 139 also include, in this example, a portal application 60, which, as will be described in greater detail below, provides an advertising and multimedia content portal on the mobile device display 12 during idle periods such as when the user is on a phone call or when an otherwise "idle" period is detected. The portal application 60 utilizes a portal queue data store 61, which maintains a queue of actions that require a data communications link which is currently being used by the main application (e.g. phone) and thus otherwise unavailable to the portal application 60. An example would be a click-through to an advertiser's website. In other words, the contents of the portal queue 61 are associated with user interactions with the portal application 60 that cannot be executed until the currently running application (e.g. phone) is cancelled and provides a set of instructions to execute when the data communications link becomes available. The portal application 60 also has access to an advertising content cache 63, which stores one or more sets of cached advertising and multimedia content that is displayed to the user through the portal application 60. As shown, the advertising content cache 63 may itself store a legacy or log 338 that can track previous advertising content and user interactions with the portal application 60 to minimize repetition and to allow users to access old content if desired.

Figures 9, 10:
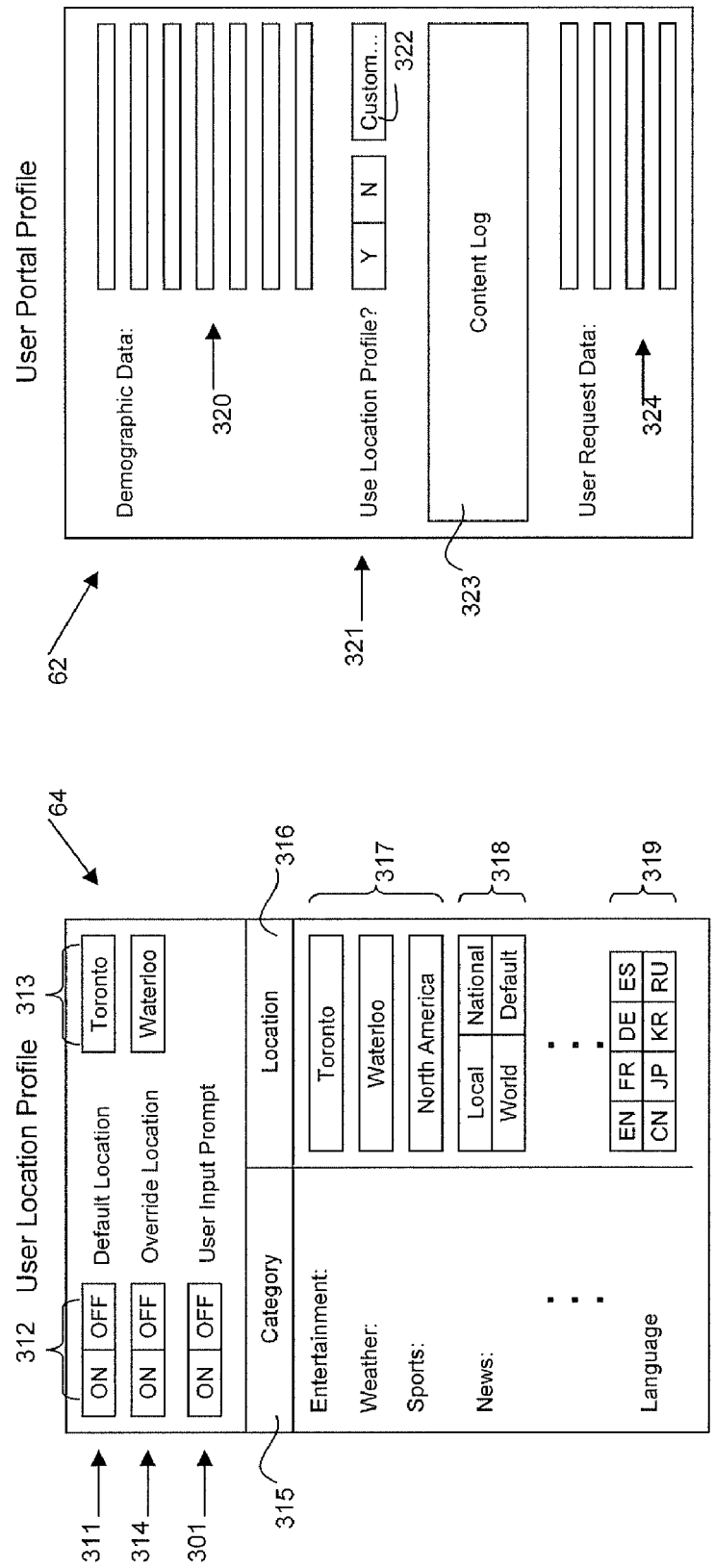
FIG. 9 is a screen shot showing an exemplary user interface (UI) for a user location profile.
FIG. 10 is a screen shot showing an exemplary user interface (UI) for a user portal profile.

Also shown in FIG. 3 is a user portal profile 62 and a user location profile 64. The portal profile 62, which will be shown and explained in greater detail with reference to FIG. 10, contains user selected information to assist the portal application 60 in determining what content should be provided to the user and when. As will be explained below, the portal profile 62 contains information such as demographic and user-specified requests for certain content, and can be linked to the location profile 62. The portal profile 62 can be used to filter advertising content either before it enters the cache 63 (i.e. at some intermediary) or on the mobile device 100 before it is displayed through the portal application 60. As such, the advertising content cache 63 can include pre-filtered content or user-specific content depending on whether the advertising content is processed for the user at such an intermediary or on the mobile device 100. Examples are provided below illustrating variations in such filtering. The location profile 64 contains user-specified information to assist in making location-based decisions for matching advertising content to a particular user, i.e. to provide context. As will be discussed below and as shown in FIG. 9, the location profile 64 contains a user's location-based preferences that relate to both physical location (of the mobile device 100) and preferred location, i.e. locations that may be different than the actual location of the mobile device 100.

Location based services (LBS) 298 for the mobile device 100 are naturally dependent on knowledge of the location of the mobile device 100 in order to determine appropriate, location-based content for the user of the mobile device 100, in particular where the content is location dependent or would otherwise be more relevant if filtered based on physical location or user location-based preferences or both.

Turning now to FIGS. 4 to 6, various configurations are shown for providing location data 300 to an LBS 298 in order to obtain or receive user-specific content, herein referred to as LBS content 302. The systems shown in FIGS. 4 to 6 are utilized to localize information such as weather, news, local events, etc. according to a location hierarchy of: 1) GPS location; 2) Current cell tower location; 3) User Input or Preferences; and 4) Data available from the SIM/RUIM/USIM card 126 (e.g. area code or postal code). This hierarchy can be used alone to provide location data that relates only to the physical location of the mobile device 100 or along with user-input related location data. Such user-input related location data can be used for filtering certain LBS content 302 such as advertisements for a user based on locations specified by user preferences (e.g. as specified in the user location profile 64) rather than or in addition to the physical location of the mobile device 100. In this way, for example, a user can receive news from their home city even when travelling. Although the systems shown in FIGS. 4 to 6 include simplified block diagrams showing only certain ones of the components involved in generating location data 300 and LBS content 302, it will be appreciated that these configurations can be implemented with the systems and operations thereof as described above as well as other similar systems.

Referring now to FIG. 4, one configuration comprises having the location estimator 54 reside solely on the mobile device 100 with the LBS 298 at an intermediate node or intermediary such as the host system 250 or router 26 described above. It will be appreciated that the host system 250 and router 26 are shown only for illustrative purposes and for ease of explanation and other intermediaries such as ISPs, third party web servers and the like may also perform this role. This configuration divides the processing tasks associated with the location estimation and filtering processes between the mobile device 100 and the host system 250 or router 26. In this way, the mobile device 100 runs the location estimator 54 to provide to the LBS 298 the location data 300 available to the mobile device 100 and, in return, the LBS 298 filters and provides location-specific LBS content 302 to the mobile device 100. The LBS content 302 can be used in many different applications on the mobile device 100 such as for providing user-specific advertising content to the user as will be exemplified below.

FIG. 5 shows another configuration that divides the processing requirements between the mobile device 100 and the intermediary—i.e. the host system 250 or router 26 in this example. In this configuration, portion A of the location data 300 is determined or otherwise acquired at the mobile device 100 by a mobile location estimator 54a and sent to a central location estimator 54b at the intermediary. Portion A is combined with portion B of the location data 300 to generate the complete set of location data 300, which is processed by the LBS 298 as in the above configuration to generate the LBS content 302. This configuration is most suitable where certain location information is more conveniently accessed by the mobile device 100 whereas other location information is more conveniently or efficiently accessed at the intermediary. For example, the GPS location may be acquired on the mobile device 100 and sent to the host system 250 or router 26 which stores and updates the user location profile 64.

Referring now to FIG. 6, one example is shown where all of the location estimation tasks are handled by one entity, in this example the mobile device 100. It will be appreciated that a similar configuration wherein all components reside at the intermediary may also be used. It can be seen in FIG. 6 that the location estimator 54 generates the location data 300 in a manner similar to the configuration of FIG. 4, however, in this configuration, the LBS 298 resides on the mobile device 100 and thus the LBS content 302 can be generated locally and used in connection with a program or application without relying on a connection with the intermediary at all times. In the example shown, the LBS content 302 is provided to the display 110 component of the mobile device 100 that operates the physical display 12.

Figure 7:
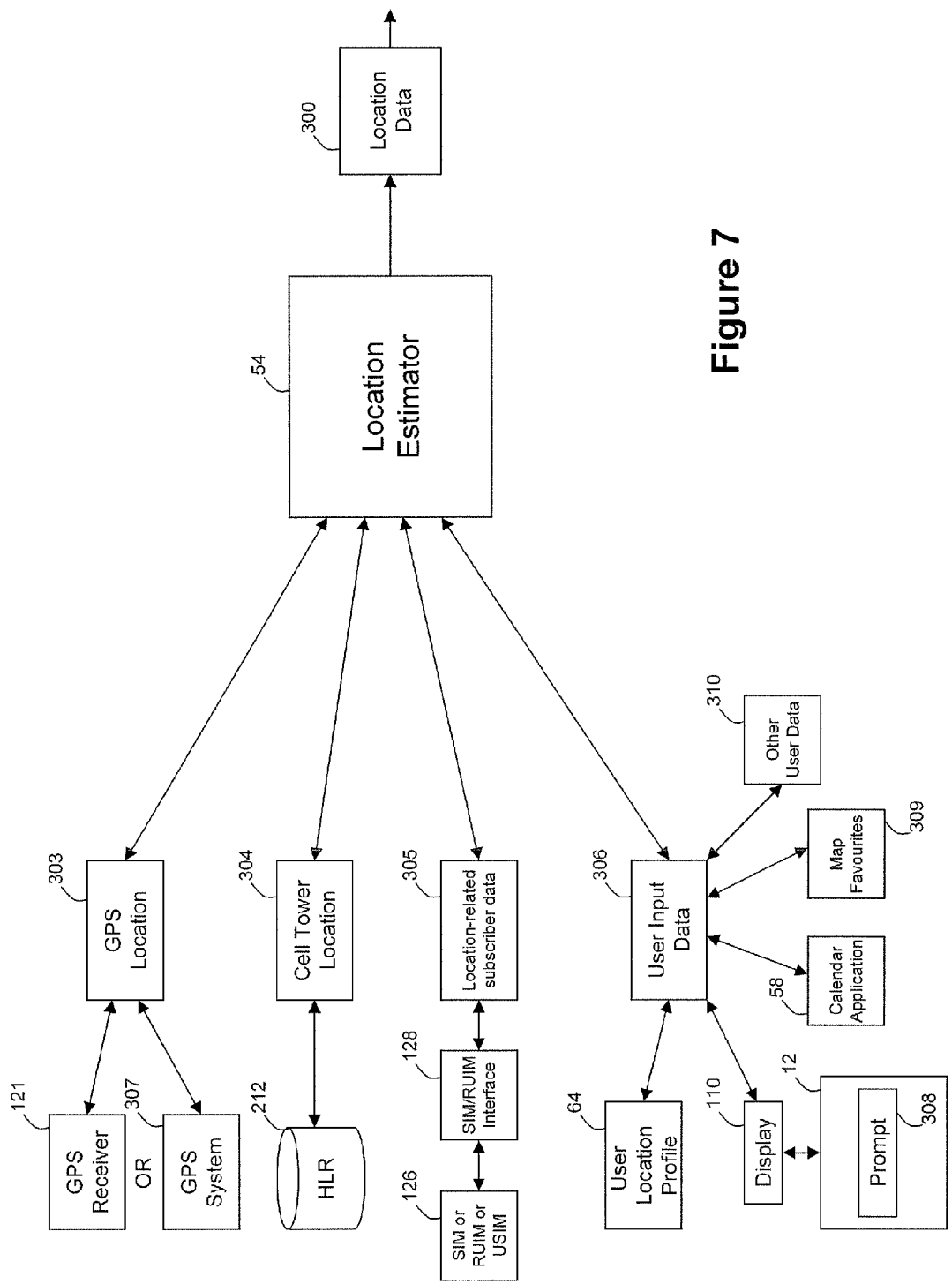
FIG. 7 is a flow diagram showing the retrieval of data by the location estimator for generating the location data in accordance with one embodiment.

FIG. 7 illustrates an example of the flow of data to the location estimator 54 for generating the location data 300. In this example, the location estimator 54 utilizes GPS location 303, cell tower location 304, location-related SIM data 305 and user input data 306 according to a hierarchy as described in greater detail below (see also FIG. 8). The GPS location 303, depending on whether this data is acquired by the mobile device 100 or the intermediary (host system 250 or router 26 in this embodiment), is acquired from either the GPS receiver 121 (on the mobile device 100) or directly from an associated GPS system 307 (at the intermediary) if available. The cell tower location 304 can be obtained directly from an HLR 212 of the wireless network 200, in particular from a specific node 202 (details provided above) or any other network component that is capable of determining or having access to the location of the mobile device 100 with respect to a certain one or ones of the cell towers in the wireless network 200. It will be appreciated that other techniques for obtaining location may be used in various embodiments such as without limitation, obtaining information from the VLR 214, or triangulation using at least three tower stations, or other suitable techniques. The location-related subscriber data 305 is obtained from the SIM/RUIM/USIM card 126 through the SIM/RUIM/USIM interface 128 and may include any location-specific information stored in the SIM/RUIM/USIM card 126. This may include the area code of the mobile device's phone number, a postal code or other address information or even calendar appointments that are sometimes stored temporarily on the SIM/RUIM/USIM card 126.

As can be seen in FIG. 7, the user input data 306 can come from various different locations and processes. The examples shown in FIG. 7 include the user location profile 64, a prompt 308 through the display 12 and display component 110, the calendar application 58, map favorites 309 and other user data 310. The prompt 308 can be an optional mechanism for obtaining user input when other relevant data cannot be found or if the user chooses to actively participate in specifying their location. The prompt 308 can include a dialog box with an entry portion to enable the user to enter their current location if prompted. The calendar application 58 can provide appointment details such as location of a meeting. The map favorites 309 illustrates one way of obtaining relevant user data indirectly. For example, users often use a map application (not shown) on their mobile device 100 to find directions to a specific location. Depending on how long it has been since the map application has been used, the map data that was last accessed or as shown in FIG. 7, map data that is included as a favorite may be useful in determining a relevant location. The other user data 310 can be from any application or service for the mobile device 100 that can provide an indication, however insignificant, of where the user may be, may wish to be, has been etc.

The user location profile 64 is shown in greater detail in FIG. 9. As noted above, the user location profile 64 enables a user to specify location-based preferences so that LBS content 302 such as advertisements, weather, news, etc. can be tailored to their lifestyle. Since a user's physical location may not necessarily correspond to the relevant location for the user, the user location profile 64 allows the user to customize content for relevance. For example, although the user's physical location is typically relevant for weather information, a user may prefer to receive news articles that are local to where they live or work, regardless of their physical location. Another example pertains to language. A user travelling in Europe may presently be in France but live in Germany and thus wish to receive only German-language advertisements, news and other content even when currently in France. Turning now to FIG. 9, several examples of suitable user preference options are shown. In this example, the user can select and distinguish between a default location 311 and an override location 314. The default location 311 can be used to specify a location to be associated with the user if no other information is available. The override location can be used to override other mechanisms for estimating physical location and other preferences. An example of a use for the default location 311 would be for the user to specify their home city or where they work, i.e. a place where they spend a significant amount of time and thus sporting events, concert tickets and other promotions would likely be of interest to them. An example of a use for the override location 314 would enable a user to override more relevant information and direct it to the specified city. In this way, a user that is travelling may wish to only receive weather reports for their home city even though they are experiencing different weather in their physical location. Any other motivation can form the basis for specifying an override or default at the user's discretion. As can be seen, when displayed in a user interface (UI), the location profile 64 can include ON/OFF toggle buttons 312 to enable the user to turn the associated feature on or off as well as input boxes 313 to specify the desired location. As also shown in FIG. 9, the user can specify whether or not they may be prompted to provide their location by turning a user input prompt option 301 to be "ON" or "OFF".

The user location profile 64 can also allow the user to specify a location 316 for a number of different categories 315. The examples given in FIG. 9 include entertainment, weather, sports, news and language categories 315 and illustrates several input mechanisms to allow the user to conveniently set and modify their preferences. These include input boxes 317, multi-choice buttons 318 with different regional preferences, and multi-choice buttons 319 showing available languages. It will be appreciated that the categories 315 and selection mechanisms 312, 313, 317, 318, 319 shown in FIG. 9 are for illustrative purposes only and that any suitable UI components can also be used in addition to or rather than those shown. In general, the location profile 64 allows the LBS 298 to filter the available content to provide a more relevant set of LBS content 302 to a specific user. It can be seen that user selected preferences can be used to improve the relevance of the LBS content 302 for that user.

Having access to location-based information such as the GPS location 303, cell tower location 304, user input data 306 and location related subscriber data 305, the location estimator 54 can use a hierarchical approach for generating the location data 300. In one embodiment, the location estimator 54 applies a hierarchy to estimate a physical location (PL) for the mobile device 100 so that the LBS 298 can associate relevant content with that particular mobile device 100. In another embodiment, the location estimator 54 applies the hierarchy to estimate the PL while in parallel using the user input data 306 to provide additional context for the LBS 298. This allows the LBS 298 to associate some content with physical location and other content with user-specified locations. For example, the LBS 298 may provide weather data that is relevant to the user's surroundings and sports scores relevant to home teams, preferred leagues etc. As noted above and shown in FIGS. 4-6, the location estimator 54 can operate in the mobile device 100, in an intermediary or both. The LBS 298 can also operate in the mobile device 100, in an intermediary or both. The following examples apply to any one of these configurations.

Figure 8:
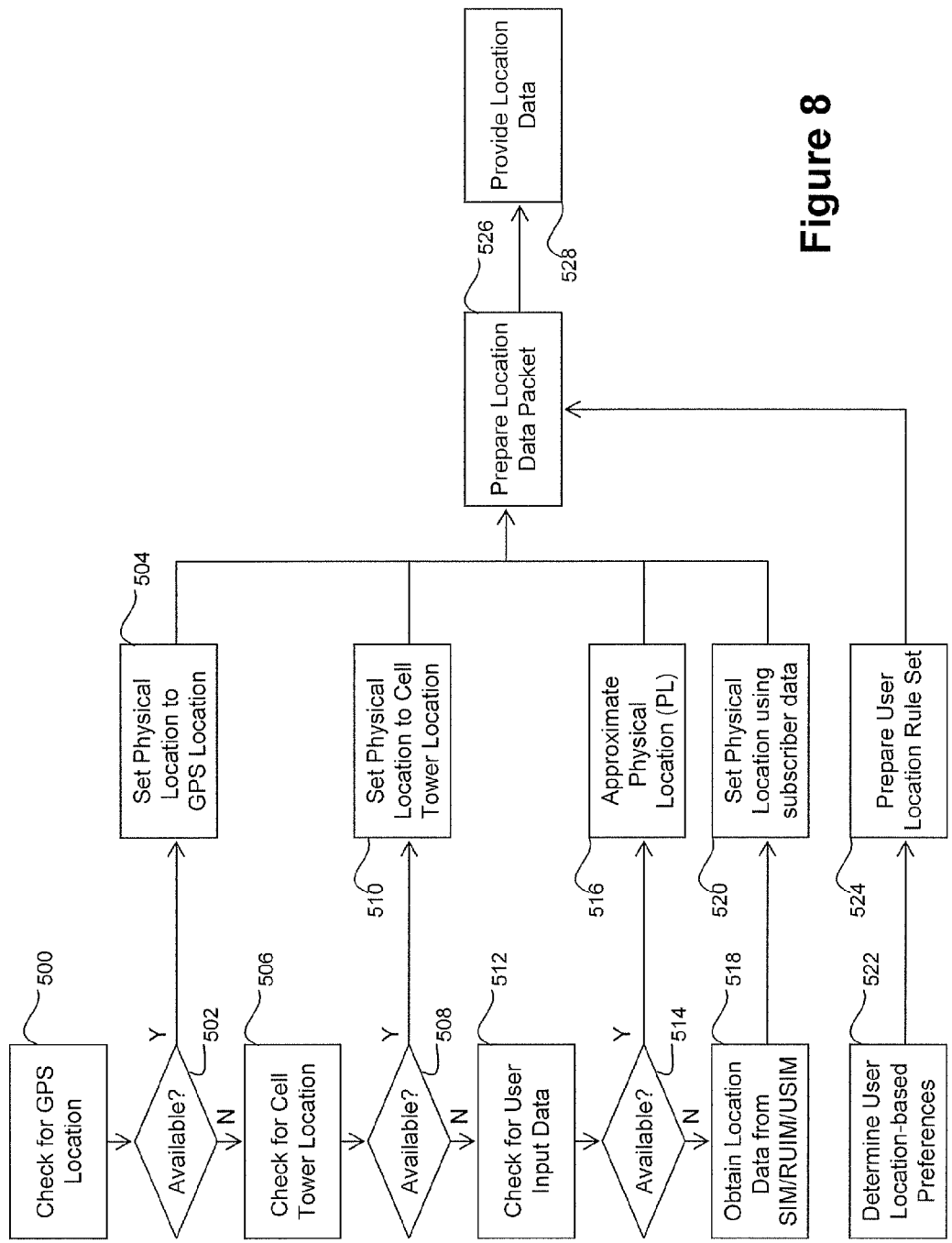
FIG. 8 is a flow diagram illustrating a method for applying a hierarchical location estimation of location for generating the location data in accordance with one embodiment.

FIG. 8 illustrates one example of a series of computer readable instructions performed by the location estimator 54 to generate the location data 300. This example applies the following hierarchy for estimating the PL: 1) GPS location; 2) Cell tower location; 3) User input data and other user related information; and 4) Subscriber location-based data. Following this hierarchy, if the GPS location is not available, the cell tower location can be used. If the cell tower location is also unavailable, the user input and other information can be used, e.g. without limitation a calendar appointment, location profile, geotagging data associated with a web site, blog, RSS feed, or photograph, etc., (e.g., data uploaded by the mobile device 100 to a web site such as Twitter™, Facebook™, or Flickr™, etc.). If no relevant user data can be found, data on the SIM/RUIM/USIM card 126 can be used. At 500, the location estimator 54 checks the GPS receiver 121 or GPS system 307 for any available GPS coordinates. Tolerances can be specified such as how current are the coordinates. At 502, if the GPS coordinates are available and relevant, the location estimator 54 sets the PL to be equal to the GPS location at 504. If the GPS coordinates are not available or are out-of-date, the next level in the hierarchy, namely the cell tower location 304 is investigated at 506. At 508, if the cell tower location 304 is available, e.g. from the HLR 212, then the PL is set to be a region or area associated with or close to the specified cell tower at 510. If the cell tower location 304 is not available or otherwise not relevant, the next level in the hierarchy is examined, namely the user input data 306 at 512. If relevant user input data 306 is deemed to be available at 514, the most relevant of such available user input data 306 is used by the location estimator 54 to provide an approximate PL at 516. Further details of such an approximation are explained in greater detail below making reference to FIG. 11. If the user input data 306 is not available or cannot be deemed acceptable or relevant, the location estimator 54 instructs the processor 102 to access data from the SIM/

RUIM/USIM card 126 through the SIM/RUIM/USIM interface 128 at 518. Since the SIM/RUIM/USIM card 126 stores at least the phone number for the mobile device 100, it will have at the very least an area code that can be used to specify the PL. It can be appreciated that by virtue of the mobile device 100 being "mobile", the area code is typically not as relevant as, e.g. the GPS coordinates; however does ensure that a location can be specified. The SIM/RUIM/USIM card 126 may also store other information such as an address and postal code, recent calendar appointments and other data that can provide evidence of a relevant location. Therefore it may be appreciated that the location-based subscriber data 305 may comprise any available data and should not be limited to area code only. If the hierarchy proceeds to this level, then the most relevant location-based subscriber data 305 is used to set the PL at 520.

As can be seen in FIG. 8, in addition to determining PL, the location estimator may, in parallel to applying the hierarchy, determine user location-based preferences at 522 and prepare a user location rule set at 524. This rule set and the PL determined above are combined at 526 to prepare a data 300 packet or other data structure suitable for providing the location data 528 to the LBS 298. The user location-based preferences 522 are determined from the user input data 512, namely in this example as taken from the user location profile 64. The rule set prepared at 524 can specify locations for certain categories and rules for overriding or defaulting certain content to the specified locations. As explained below, the user location-based preferences can also be estimated from other user input data 306 such as appointments extracted from the calendar application 58 and location data extracted from map favourites 309.

As noted above, the location estimator 54 can at one level of the hierarchy, approximate PL according to user input data 306, i.e. when determining if the user input data 306 is available at 514. FIG. 11 illustrates one example for performing such an approximation, using the exemplary user input data 306 shown in FIG. 15. At 530-536, the location estimator 54 first gathers the relevant data, e.g. by having the processor 102 access the calendar application 58, the map program and any other user data. At this time, the location estimator 54 can access the user location profile 64 to determine if any overrides or defaults exist that would assist in performing the location approximation. Then, at 538, the location estimator first determines if there is an override location 314 specified by the user. As discussed above, this can be used to ignore actual PL in favour of a user-specified location. If it is determined at 540 that an override location 314 has been specified (i.e. toggle button 312 is set to "ON" and a location entered at input box 313), the PL is set to the override location 314 at 542. If the user has turned off the override location 314 or this information is otherwise not available, the location estimator 54 may then compare the calendar data to the map data. This may be done to determine if there is any correlation between an appointment and a recently accessed map location. For example, a user when reminded of a meeting may use their map program to find directions. If the calendar and map data are deemed to be similar at 546, the PL is set to be the common location data at 548. If such data is not similar, this may indicate that the most recent location in the map program has nothing to do with a current or recent appointment. It may be noted that if no recent calendar appointments even exist, 544-548 may simply be skipped. If the calendar and map data are not similar, this data may then be compared to the other user data at 550. For example, the other user data 310 may include a memo or note that provides context for an appointment or for a map. If the other data 310 is deemed to be similar or relevant at 552, the similar location is used as the PL at 554. It will be appreciated that in some embodiments, only the calendar data may be referenced without any correlation with other data performed. For example, if an appointment in the user's calendar comprises a location field, which is populated, such location field can be used to determine the mobile device's location, in particular where the meeting is hosted by or has been accepted by the user.

If the calendar, map and other data do not correlate in any way, the location estimator may then use any available location information in the calendar appointment at 556. If a location can be found in the calendar appointment, the PL is then set to be the location specified in the calendar appointment at 558. An example would be a meeting appointment that gives an address for a client or customer site, which can indicate to the location estimator 54 where the user is at that time. It may be noted that the other user data 310 may include an indication as to whether or not the user accepted the appointment in the calendar since appointments that are scheduled but not necessarily accepted may still be posted in the calendar application 58. If the calendar application 58 does not provide any relevant location-based information, the location estimator 54 may then check for a user default location 311 at 560. In this way, the user can specify a default so that if no relevant and current information is available, the location estimator 54 can choose the default location 311 as the PL at 564 to ensure the LBS content 302 is at least directed to an associated and familiar geographical area. If the user default location 311 is not turned "ON" or is not relevant (e.g. misspelled location in input box 313), the location estimator 54 then determines if the user has permitted a prompt 308 to be used at 566, i.e. set the prompt option 301 to "YES". If a prompt 308 is permitted, the prompt 308 is displayed to the user at 568. The prompt 308 may expire after a specified amount of time so as to not disrupt the PL approximation process in case a user response is not received at 572. If the prompt 308 is not permitted or a response to the prompt 308 is not received in a predetermined amount of time, the PL approximation routine ends at 570. If a response to the prompt 308 is received at 572, the user input acquired from the prompt 308 is used to approximate the PL at 574.

It can be seen from FIGS. 8 and 11 that if the user input data 306 is irrelevant or otherwise not available at 514, the location-based subscriber data 305 is instead used as the PL. As such, the hierarchy enables the location estimator 54 to step through data available to the mobile device 100 (and/or intermediary if applicable) and at any given time give the best estimate possible for ensuring the LBS content 302 is relevant to the user of the mobile device 100.

Figure 12:
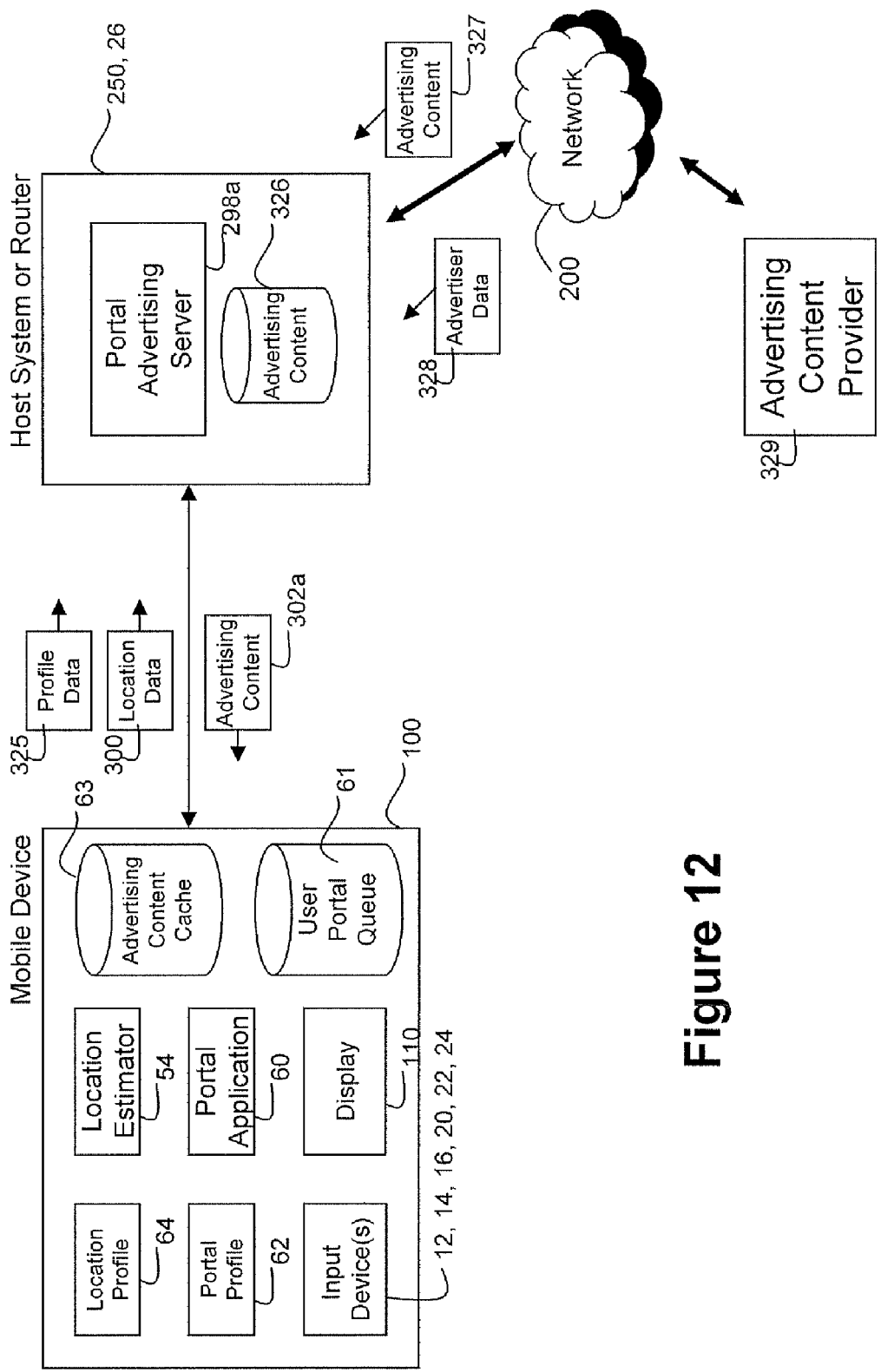
FIG. 12 is a block diagram showing one configuration for fetching advertising content and displaying such content on the mobile device using a portal application in accordance with one embodiment.
Figure 13:
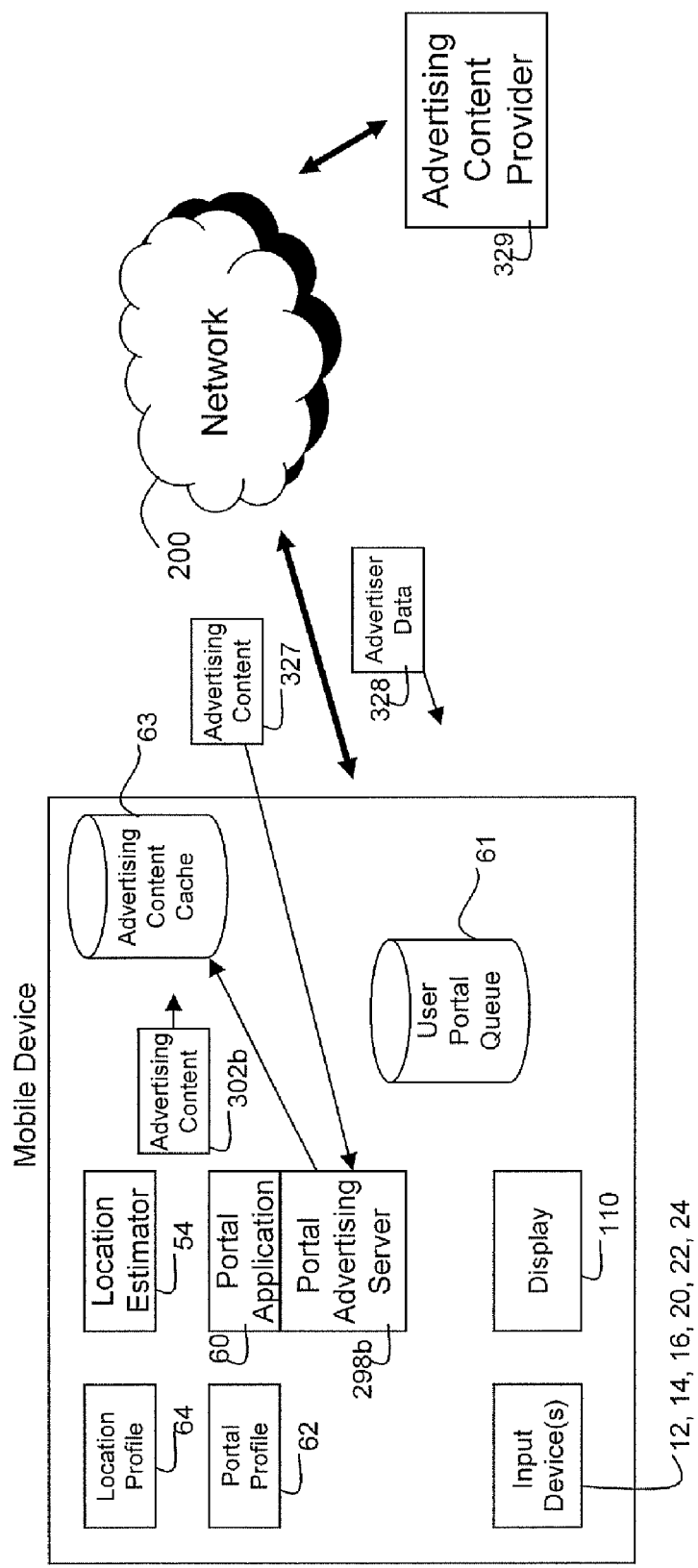
FIG. 13 is a block diagram showing another configuration for fetching advertising content and displaying such content on the mobile device using a portal application in accordance with one embodiment.

Referring now to FIGS. 10 and 12 to 17, operation of the location estimator 54 will be exemplified as used with the portal application 60 discussed above. FIGS. 12 and 13 illustrate configurations where the LBS 298 is a portal advertising server 298a running on the intermediary (e.g. host system 250 or router 26) and the mobile device 100 (as 298b) respectively. Turning first to FIG. 12, it can be seen that the portal application 60 in this example resides on the mobile device 100 along with the location estimator 54, similar to the configuration shown in FIG. 12. For the sake of convenience, other relevant mobile device components are shown in FIG. 12 such as the location profile 64, portal profile 62, advertising content cache 63, user portal queue 61, input devices (e.g. any one or more of 112, 114, 116, 120, 121, 122) and the display component 110. In this example, the mobile device 100 provides the location data 300 using the location estimator 54, as described above and shown in FIGS. 4-9 and 11; and provides profile data 325 as specified in the portal profile 62.

It will be appreciated that data from the portal profile 62 may also be transported with the location data 300 and is shown as a separate data packet only for the sake of clarity. The mobile device 100 receives from the host system 250 or router 26, the advertising content 302a that is deemed to be relevant to the user of the mobile device 100, which is stored in the advertising content cache 63 for use by the portal application 60 during idle periods, which are determined by detecting "idle events". In general, idle events can be associated with the way in which the mobile device 100 is being used, e.g. while certain applications are being used, or can be associated with certain time periods such as typical time periods when the user's attention may be more obtainable.

The portal advertising server 298a represents an exemplary implementation of the LBS 298 shown in FIGS. 4-6 and thus it will be appreciated that the advertising server 298 may operate according to the principles discussed above. The portal advertising server 298a has access to an advertising content data store 326, which typically contains all available LBS content 302, including that which is relevant to the user of the mobile device 100 shown in FIG. 12 as well as other users of other mobile devices 100 that are not shown. In other words, the advertising content 326 at the intermediary contains the unfiltered content that is filtered per-user by the portal advertising server 298a when generating the advertising content 302a that is sent to the mobile device 100. As can also be seen in FIG. 12, the intermediary obtains advertising content 327 and advertiser data 328 from advertising content providers 329 through the network 200 or any other suitable communication method. It may be noted that "advertising content" (both filtered and original) and "advertiser data" collectively refer to content and details respectively of and from providers of any content that is used by the portal application 60, including content that is considered to be an advertisement in the traditional sense as well as other content that may be, e.g., "brought to you by" an advertiser, such content including weather and news content (i.e. not an advertisement in and of itself). The term "advertiser" and "advertisement" are thus used only for illustrative purposes in describing the mechanisms for operating the portal application 60 as described in detail below.

FIG. 13 illustrates a configuration where the mobile device 100 runs a local version of the portal advertising server 298a. In this configuration, the advertising content 327 originating from the content provider 329 is sent directly to the portal advertising server 298b on the mobile device 100, which is then filtered for relevance, and the advertising content 302b is then stored in the advertising content cache 63. It will be appreciated that the advertising content cache 63 can be used to store both unfiltered and filtered advertising content 327 and 302b respectively and the data flow shown in FIG. 13 is merely provided for clarity and ease of understanding. The advertising content 327 can be pushed to the portal advertising server 298b by the advertising content provider 329 (which according to the above would utilize the router 26) or can be downloaded (i.e. pulled) by the mobile device 100 at periodic intervals. It will be appreciated that portal application 60 may operate on the mobile device 100 as exemplified below and shown in FIGS. 14-17 regardless of which configuration is used for obtaining the filtered advertising content 302a or 302b.

Turning now to FIGS. 14(a) and 14(b) a generic screen shot is shown which illustrates a UI for the portal application 60, in this example referred to as a portal browser 331. The portal browser 331 is launched by the portal application 60 during specified "idle" periods when the mobile device 100 detects "idle events", to provide the advertising content 302 to the user and thus take advantage of the idle period. In many instances, the idle period coincides with a busy data communication link and therefore the advertising data cache 63 can be advantageously populated with advertising content 302 by pre-fetching the advertising content 302 with up to data content on a regular basis. As illustrated in FIG. 14(a), the portal browser 331 is given a portion of the mobile device display 12, which it shares with a currently running application, referred to as the "current application 330" in FIG. 14(a). The intention for the portal browser 331 is to provide content to the user at appropriate times when their attention is most conveniently captured. By providing content which is appropriate to the user (and their location if applicable), the user can benefit from being provided with the opportunity to fill idle periods by browsing advertising and media content while also providing a mechanism for generating revenue that can offset some cost of operating the intermediary, in particular when a host system 250 or router 26 is required. It may be noted that the portal browser 331 may also be launched on its own, i.e. without any other application currently running, for example if the idle event is a time-based event such as when a user is expected to be commuting on the subway or waiting for a flight etc. It will be appreciated that in various embodiments, calendar data can be used to determine idle time, e.g. 1 hour before a flight, moving at a high velocity (e.g. determined using GPS), etc. Also, the portal application 60 can utilize other cues in determining whether to launch the browser 331 such as detection of movement of the mobile device 100 using an accelerometer or an altimeter (e.g. if on a plane). A device such as an accelerometer can thus be used to determine when a mobile device 100 is stationary, being held, or moving to assist in determining when the user's attention is likely to be captured at that moment. Similarly, the mobile device 100 can detect when it has been docked or placed in a holster or other carrying case when determining if an idle event is appropriate. In addition, the mobile device 100 can use photosensor data, touch-sensitive input data and other data to determine if an idle event is appropriate. For example, the mobile device 100 can detect whether it is sheathed in a pocket or held against a user's cheek or face and therefore determine that the display is not being viewed by the user. Furthermore, the mobile device 100 can detect whether user input, such as keystrokes, touch-sensitive inputs, trackball actuation, positioning wheel actuation, etc., has not been received after a certain threshold time period, when determining if an idle event is appropriate.

The portal application 60 may operate in this example with the main processor 102 to instruct the main processor 102 to intelligently detect an idle event according to predetermined criteria. Such criteria may include detecting when the current application 330 is one of a list of appropriate applications such as the phone application where the user may be listening to a phone call but is also able to browse the portal browser 331 at the same time. Other applications that include similar idle events include web browsing, playing a game or rendering a particular type of content such as a news story. Another criterion may include the detection of certain system states such as when a data connection is lost, e.g. when on the subway and reading email but unable to send email or based on cues such as movement, whether the mobile device 100 has been docked or holstered etc. As such, the portal application 60 detects certain conditions and, when detected, launches the portal browser 331 and populates the portal browser 331 with content that is not only appropriate to the user, but also displayed to the user at a time which is perceived to be beneficial or otherwise appropriate. This allows advertisers to be more confident that the content is being displayed to the right users at the right times and is not seen as a nuisance.

As noted above, the content which populates the portal browser 331 can be pre-fetched at periodic intervals or when a data communication link is available so that the advertising content 302a can be displayed at any time, regardless of which application or program is the current application 330. For example, as will be exemplified below, the use of the portal browser 331 is particularly suitable when the current application 330 is a phone application 330a. However, in 2G and 2.5G wireless networks, the user is limited to either data service (GPRS in 2.5G) or voice service but not both at the same time. Thus, when using these types of networks, when the current application 330 is the phone application 330a, the data service link is suspended for the duration of the call. The pre-fetched advertising content 302a updates the advertising content cache 63 whenever possible (i.e. when a data link is available and according to predefined intervals) and can populate the portal browser 331 as if the portal browser 331 had a data connection. Of course, it will be appreciated that in various networks that allow simultaneous voice and data communications (e.g. 3G or 4G networks such as EDGE, UMTS and HSDPA, LTE, Wi-MAX etc.—described above), the portal browser 331 can be configured to use any available data connection, e.g. if the phone application 330a is being used, to fetch content in real time or to redirect users to websites in response to a "click-through". Therefore, it can be appreciated that the portal browser 331 may comprise an interactive application that is intelligently launched at specific times and offers content to the user in various forms from various sources. Examples of the portal browser 331 and the nature of such content will be explained in greater detail below.

When the current application 330 does not require any significant or constant user interaction, the portal browser 331a may be enlarged as shown in FIG. 14(b) to enable more content to be displayed and to allow the user more freedom in browsing. When the enlarged portal browser 331a takes over the display 12 as shown in FIG. 14(b), a status bar 332 for the current application is inserted, e.g. at the bottom of the display 12 to ensure that the user is reminded that the current application 330 is running in the background.

Figures 15A, 15B:
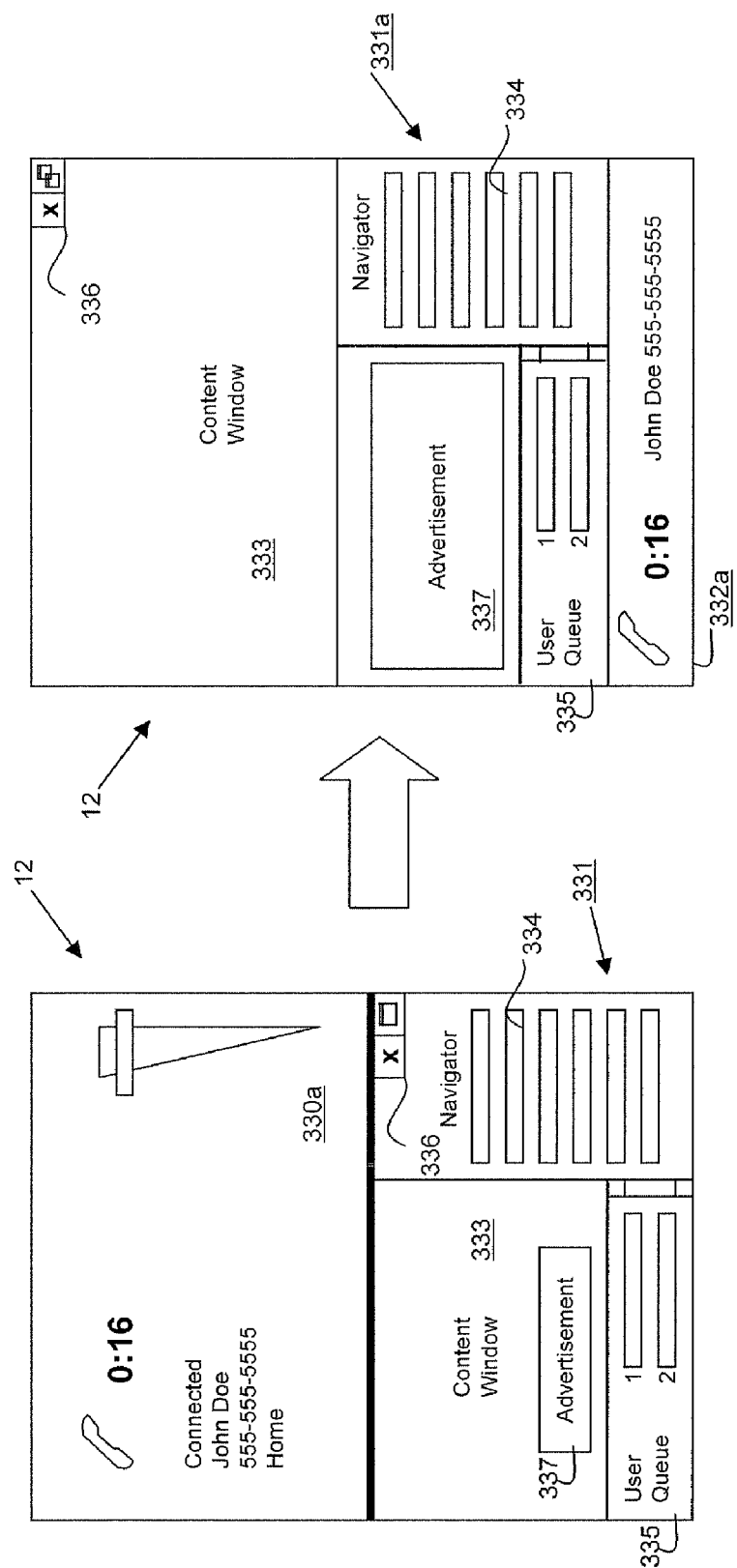
FIG. 15(a) is a screen shot similar to FIG. 14(a) where the current application is a phone application.
FIG. 15(b) is a screen shot similar to FIG. 14(b) during use of the phone application.

An example showing a use of the portal browser 331 during use of the phone application 330a is shown in FIG. 15(a). As noted above, it is sometimes the case where a user is participating in a conference call which does not require their full attention and does not require use of the entire display 12. This creates an idle event for the display 12, i.e. a portion or all of the display 12 is not being fully utilized and it is an appropriate time to launch the portal browser 331. In other words, during a phone call, the minimal user interactions needed other than voice creates an opportune time to take over part of the screen 12 with the portal browser 331.

The portal browser 331 can take over a portion of the display 12 as shown in FIG. 15(a) and may include various media content, including advertisements and the like. In this example, the portal browser 331 includes a content window 333 that can be considered the main browsing window and can be updated by selecting different items from a navigator 334. The navigator 334 shows a list of pre-fetched advertising content 302a, which can be selected by the user and consequently displayed in the content window 333. Also shown in FIG. 15(a) is an advertisement 337. The advertisement 337 is shown for illustrative purposes only and to exemplify a case where the content window 333 displays content that is not an advertisement itself but is provided by a certain advertising content provider 329. An example would be latest news stories, weather updates, sports scores, etc. The content window 333 can also be used to show only an advertisement 337 either for a predetermined amount of time or where the advertisement 337 is deemed to be of interest to the user. An example would be top selling games, movie advertisements etc.

Also shown in FIG. 15(a) is a user queue 335 which can be optionally displayed within the portal browser 331. The user queue 335 is a mechanism that allows a user to queue up tasks that require a connection to the wireless network 200 but where such a connection is unavailable while the user is browsing. Once the data connection is available, e.g. when the phone application 330a is terminated, the user queue 335 can launch an appropriate application such as an Internet browser to direct the user to a web site etc. It may be noted that the user queue 335 can be used to queue up other tasks such as phone calls. For example, if the current application 330 is one that consumes the data connection and the user wishes to call a phone number included in the content window, this number can be queued up and called when the voice link is again available. It can be seen that more than one task may be queued in the user queue 335. FIG. 15(b) illustrates an example according to FIG. 14(b) where a phone status bar 332a is displayed upon resizing the portal browser 331 using one of the size control buttons 336.

Although the portal browser 331 is shown in FIGS. 14 and 15 and described above as being launched at specific idle events, e.g. when the phone application is running, it will be appreciated that the portal browser 331 can also be launched at the user's discretion, either during use of a current application 330 (e.g. by providing a menu option), by providing an icon 42 on the home screen 40, or using any other mechanism. In this way, the user can go back to the pre-fetched advertising content 302a at a later time to look at content again or to continue browsing at their leisure. As will be described below, since the advertising content 302a is pre-fetched and updated on a periodic basis, the portal application 60 may include a legacy archive or log 338 of previous advertising content 302a, e.g. by storing such archive or log in the advertising content cache 63, so that the user can "go back" to content they may have seen on previous days and is no longer current in the portal browser's navigator 334. The log 338 can also be used to track what content has been provided and what content the user has viewed or interacted with to allow the portal application 60 to intelligently update the navigator 334 so that the user is not faced with repetitive content or content that is irrelevant or outdated.

FIG. 16 shows an example of a series of computer executable operations that can be performed by the portal application 60 to pre-fetch advertising content 302a. It will be noted that the algorithm shown in FIG. 16 is for illustrative purposes only and as will be explained below, certain ones of the operations may be executed in a different order or may be done in advance or in parallel. The example shown in FIG. 16 is most suitable for the configuration shown in FIG. 13 where the mobile device 100 hosts the portal advertising server 298b. Turning now to FIG. 16, at 576 a pre-fetch routine is initiated, e.g. by the portal application 60. In this example, the location estimator 54 is utilized to filter the advertising content 327 for relevance to the user. At 578, the portal application 60 runs the location estimator 54 to generate location data 300. The portal application 60 then accesses the location profile 64 and portal profile 62 at 580, whereby the location profile 64 can be used by the location estimator 54 to generate the location data 300. The portal profile 62 is then used with the location data 300 to filter the advertising content 327 at 582.

In order to understand the filtering performed at 584 in this example, reference will now be made to FIG. 10, which includes an example user portal profile 62. The user portal profile 62 allows the user to assist the portal application 60 in filtering the advertising content 327 so that the filtered advertising content 302a is more relevant to that user. The user portal profile 62 can include any suitable information and can be constructed using any suitable data structure and populated using any suitable UI or input mechanism. In FIG. 10, it can be seen that demographic data 320 is maintained that includes data such as age and gender, and any other data that the user is willing to provide. The portal profile 62 also includes a linking option 321, which allows the portal profile 62 to utilize the location profile 64 for location-based user data. If the user wants to specify different location-based options for the portal browser content, they may select a Custom button 322 and enter such data manually. The user portal profile 62 also includes a content log 323 which may be similar to the data stored in log 338 and indicates what the user has already viewed or would not likely be interested in. For example, advertisements for a particular game may be overlooked because the content log 323 indicates that the user has already obtained that game for their mobile device 100. As such, the content log 323 can combine both user input and can gather, track and record usage data as desired. The portal profile 62 may also include user request data 324 that specifies certain content that the user wishes to see or any other requests or preferences that the user wishes to specify. The portal profile 62 may also include a mechanism for determining appropriate time periods for providing advertising content to a user, e.g. during a commute or waiting for a flight. It can be seen that the portal profile 62 provides a mechanism to enable the user to contribute to the content filtering process as well as the detection of idle events, which benefits the advertising content providers 329 since they can be more confident in the advertising content 327 that is provided.

Turning back to FIG. 16, the filtering at 582 thus takes the unfiltered advertising content 327 at 584 and uses the location data 300 (if provided), and the location and portal profiles 64, 62 to choose the appropriate advertising content 302a. Once the filtering at 582 is completed (or during the filtering), the archive or log 338 or content log 323 or both can be checked at 586 to determine if certain items in the filtered advertising content 302a are duplicates or otherwise inappropriate or redundant. If necessary, such additional filtering is performed. The filtered data 302a can be stored in the advertising content cache 63 as a bulk set at 590 or, as shown, can first be arranged in content queues at 588 that indicate which items will be displayed in the navigator 334 at the same time and in what order. This enables the portal application 60 to simply grab content in groups and does not require any intelligence at the time of launching the portal browser 331. The advertising content 302a thus filtered, is then stored in the advertising content cache 63 at 590 for later retrieval.

As noted above, the method illustrated in FIG. 16 would be different if performed in the configuration shown in FIG. 12. For example, running the location estimator 54 at 578 would be done ahead of time on the mobile device 100 or at least in part (see FIGS. 4-6). Also, the advertising content process at 584 would likely be done in advance since a central portal advertising server 298a would likely be more frequently in communication with the advertising content providers 329 and this would be done independent of a pre-fetch routine. Also, initiation of the pre-fetch at 576 in this configuration would require a connection to the host system 250 or router 26 at an appropriate time. It can however be seen that the principles in pre-fetching the advertising content 302 so that it is available to the portal application 60 at the appropriate times is consistent in any configuration that utilizes these components.

Turning now to FIG. 17, operation of the portal application 60 will now be exemplified. At 592, an idle event such as use of the phone application 330a is detected. If in a 3G, 4G or other system that enables both voice and data simultaneously, the pre-fetch routine shown in FIG. 16 could be run in real time to obtain the most current advertising content 302. Otherwise, the advertising content cache 63 is then accessed at 594 to obtain the content for the portal browser 331. The portal browser 331 is then launched at 596 and populated at 598. The following operations are then performed as necessary while the idle event subsists (e.g. duration of phone call). At 600, the portal browser 331 detects a user interaction that requires any one or more of the content window 333, navigator 334 and user queue 335 to be updated. For example, the portal browser 331 may detect, through sensing a selection operation initiated by the user, that a new item in the navigator 334 has been selected. If so, at 602, the portal browser 331 loads the corresponding content (that would be stored in a specific location in the advertising content cache 63) into the content window 333. If the user interaction at 600 or subsequent to updating at 602 is deemed to require a data connection (or voice connection) that is currently not available at 604, a task is added to the user queue 335 at 606. It may be noted that the user queue 335 does not necessarily need to always be displayed and may instead only pop-up as shown in FIG. 15 when the queue is updated and when the queue is to be implemented.

If the update at 602 does not require an unavailable connection, or following the addition of a task to the user queue 335 at 606, the portal application 60 then determines at 608 if the idle event is done or has been terminated. This operation is used to ensure that the portal application 60 does not launch or keep the portal browser 331 running on the display 12 at inappropriate or undesired times. For example, after the phone call ends, the user may then open their message application 138 which requires many user interactions and inputs and a data connection. It may, at this time be inappropriate for the portal browser 331 to be consuming screen space and thus the portal session would end at 610. If however the idle event is still ongoing at this time, the portal browser 331 would remain open and wait until another user interaction is detected at 600. It will be appreciated that transitional operations may be utilized to indicate what is done when the idle event ends and the portal browser 331 is still in the process of updating or being used. In this case, the portal application 60 may remain on the display, e.g. along with the home screen 40 or a next application only until the operation is complete. Such transitional operations can be default steps taken by the portal application 60 or can be part of the user portal profile 62 so that the user can, e.g. tell the portal application 60 to keep the portal browser 331 on the display until they actively close it.

It can therefore be seen that the portal application 60 can be used on the mobile device 100, either at predetermined or event driven times or by user initiation, to display relevant advertising content 302 to the user at convenient times. In this way, the advertising content providers 329 can be more confident that the advertising space they are purchasing is being directed to the appropriate users and the user can be confident that they will not be overwhelmed with advertising content at inappropriate times with inappropriate content. The portal application 60 can utilize a portal browser 331 that is launched when appropriate, which displays the advertising content 302 in an interactive way and enables the user to follow up by keeping track of the user queue 335. The advertising content 302 may be filtered from the base of advertising content 327 provided by the advertising content providers 329 in advance and is pre-fetched and stored in the advertising content cache 63 for convenient access when appropriate. Screen control of the portal browser 331 also allows the user to get more out of their browsing experience during the idle event, such as for the duration of a phone call that requires minimal if any user interactions other than voice. The portal application 60 can be used with the location estimator 54 to narrow and categorize the advertising content 302 at least in part based on location, either physical location or preferred location or both. The location estimator 54 can therefore improve the filtering of the advertising content 327 and the portal application 60 illustrates one example of an application making use of an LBS 298. The different configurations described herein are for illustrative purposes only and it will be appreciated that variations of these configurations can be made while utilizing the principles discussed herein.

It will also be appreciated that the particular options, outcomes, applications, screen shots and icons shown in the figures and described above are for illustrative purposes only and many other variations can be used according to the principles described.

Although the above has been described with reference to certain specific embodiments, various modifications thereof will be apparent to those skilled in the art as outlined in the appended claims.

The invention claimed is:

1. A method for providing interactive content on a mobile device, said method comprising:
   detecting an idle event during operation of said mobile device, said idle event being indicative of an appropriate time for displaying said interactive content;
   upon detecting said idle event, displaying an interactive content portal on at least a portion of a display of said mobile device during an idle period initiated upon detecting said idle event such that the remainder of said display is available for interacting with another application during said idle period;
   using said interactive content portal during said idle period for presenting said interactive content, said interactive content being filtered from a set of content according to data pertaining to a user of said mobile device;
   enabling interaction with said interactive content during said idle period; and
   when said interaction with said interactive content entails performing a task associated with a data connection, adding said task to a queue for execution.

2. The method according to claim 1 wherein said idle event corresponds to use of a phone application on said mobile device and wherein said portal is displayed for at least a duration of use of said phone application.

3. The method according to claim 1 further comprising pre-fetching said interactive content at predetermined intervals and storing said interactive content in a content cache for said portal.

4. The method according to claim 1, wherein said data pertaining to said user is obtained from a user-defined profile indicative of preferences pertaining to filtering said interactive content.

5. The method according to claim 1 further comprising: executing said task when said data connection becomes available.

6. The method according to claim 1 further comprising:
   maintaining a log indicative of user interactions with said interactive content; and
   performing filtering of said interactive content relative to the log.

7. The method according to claim 1 wherein upon termination of a currently running application, keeping said portal on said display until a current user interaction is completed or said portal is closed.

8. The method according to claim 1 wherein said set of content comprises advertising content provided by one or more advertising content providers.

9. The method according to claim 1 further comprising: filtering said set of content using location-based data for said mobile device, said location based data indicating an estimate of a physical location of said mobile device according to the following hierarchy: GPS location; cell tower location; user related data; and location-based subscriber data.

10. The method according to claim 1, said data pertaining to said user comprising at least one of demographic data and user requested data.

11. A non-transitory computer readable medium comprising computer executable instructions for providing interactive content on a mobile device, said computer executable instructions comprising instructions for:
    detecting an idle event during operation of said mobile device, said idle event being indicative of an appropriate time for displaying said interactive content;
    upon detecting said idle event, displaying an interactive content portal on at least a portion of a display of said mobile device during an idle period initiated upon detecting said idle event such that the remainder of said display is available for interacting with another application during said idle period;
    using said interactive content portal during said idle period for presenting said interactive content, said interactive content being filtered from a set of content according to data pertaining to a user of said mobile device;
    enabling interaction with said interactive content during said idle period; and
    when said interaction with said interactive content entails performing a task associated with a data connection, adding said task to a queue for execution.

12. A mobile device comprising a display, one or more input mechanisms and a memory, said mobile device being configured for:
    detecting an idle event during operation of said mobile device, said idle event being indicative of an appropriate time for displaying said interactive content;
    upon detecting said idle event, displaying an interactive content portal on at least a portion of a display of said mobile device during an idle period initiated upon detecting said idle event such that the remainder of said display is available for interacting with another application during said idle period;
    using said interactive content portal during said idle period for presenting said interactive content, said interactive content being filtered from a set of content according to data pertaining to a user of said mobile device;
    enabling interaction with said interactive content during said idle period; and
    when said interaction with said interactive content entails performing a task associated with a data connection, adding said task to a queue for execution.

13. The mobile device according to claim 12 wherein said idle event corresponds to use of a phone application stored on said mobile device and said portal is displayed for at least a duration of use of said phone application.

14. The mobile device according to claim 12 wherein said mobile device is further configured for pre-fetching said interactive content at predetermined intervals and storing said interactive content in a content cache for said portal.

15. The mobile device according to claim 12, wherein said data pertaining to said user is obtained from a user-defined profile indicative of preferences pertaining to filtering said interactive content.

16. The mobile device according to claim 12, said mobile device being further configured for: executing said task when said data connection becomes available.

17. The mobile device according to claim 12, said mobile device being further configured for:
- maintaining a log indicative of user interactions with said interactive content; and
- performing filtering of said interactive content relative to the log.

18. The mobile device according to claim 12 wherein upon termination of a currently running application, keeping said portal on said display until a current user interaction is completed or said portal is closed.

19. The mobile device according to claim 12 wherein said set of content comprises advertising content provided by one or more advertising content providers.

20. The mobile device according to claim 12, said mobile device further comprising a GPS receiver and a subscriber identity module, said mobile device being configured for filtering said set of content using location-based data for said mobile device, said location based data indicating an estimate of a physical location of said mobile device according to the following hierarchy: GPS location; cell tower location; user related data; and location-based subscriber data.

21. The mobile device according to claim 12, said data pertaining to said user comprising at least one of demographic data and user requested data.

* * * * *